United States Patent [19]

Mimura et al.

[11] Patent Number: 4,729,777
[45] Date of Patent: Mar. 8, 1988

[54] METHOD AND APPARATUS FOR MANUFACTURING PREFORM FOR FLUORIDE GLASS FIBER

[75] Inventors: Yoshinori Mimura, Wako; Osamu Shinbori, Tokyo; Tetsuya Nakai, Fujisawa; Hideharu Tokiwa, Niza, all of Japan

[73] Assignee: Kokusai Denshin Denwa Kabushiki Kaisha, Tokyo, Japan

[21] Appl. No.: 897,297

[22] Filed: Aug. 15, 1986

[30] Foreign Application Priority Data

Aug. 22, 1985 [JP] Japan ................................ 60-184763

[51] Int. Cl.4 ............................................ C03B 37/023
[52] U.S. Cl. ...................................... 65/3.13; 65/11.1; 65/13; 65/29; 65/DIG. 16
[58] Field of Search ................... 65/2, 3.11, 3.12, 3.13, 65/29, DIG. 16, 11.1, 13

[56] References Cited

U.S. PATENT DOCUMENTS 4,040,807  8/1977  Midwinter et al. .................. 65/3.13
4,299,609 11/1981  Aulich et al. ........................ 65/3.13
4,539,032  9/1985  Tran et al. .................... 65/DIG. 16

FOREIGN PATENT DOCUMENTS 60-81033  5/1985  Japan ........................................ 65/2

Primary Examiner—Robert L. Lindsay
Attorney, Agent, or Firm—Robert E. Burns; Emmanuel J. Lobato

[57] ABSTRACT

A method and apparatus is disclosed which ensures highly accurate control of the core-cladding diameter, enabling the fabrication of a preform for the single mode fiber. Moreover, glass refining steps for dehydration, the removal of compound ions, the reduction of the absorption loss by transition metals, etc. and preform manufacturing steps are combined into a series of steps, and the entire manufacturing process can be mechanized and automatically controlled; therefore, the yield rate of product is high and the industrial-scale productivity is also excellent.

11 Claims, 10 Drawing Figures

Fig. IA 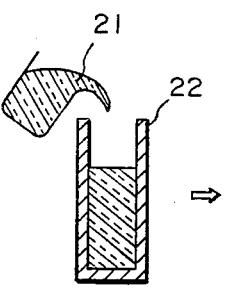 PRIOR ART
Fig. IB 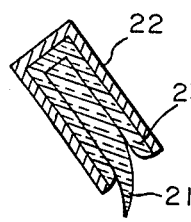 PRIOR ART
Fig. IC 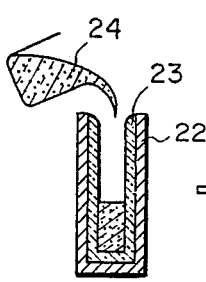 PRIOR ART
Fig. ID 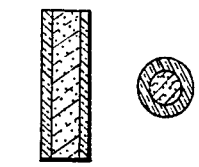         PRIOR ART

METHOD AND APPARATUS FOR MANUFACTURING PREFORM FOR FLUORIDE GLASS FIBER

BACKGROUND OF THE INVENTION

The present invention relates to a method for manufacturing a preform for drawing out thereof an optical fiber of fluoride glass which has a low transmission loss, can be made long, and is mechanically strong. The invention is applicable to the manufacture of a preform for a fluoride glass fiber which is employed for optical communications in a 2 to 4 $\mu$m band, for instance.

The use of fluoride glass is now drawing attention as a material for an optical fiber which is used for the 2 to 4 $\mu$m band communications; theoretically, an ultralow transmission low of about 0.001 dB/km is expected. At present, however, the transmission loss of the optical fiber is as large as 6 dB/km even at the smallest, its length now available is also short, of the order of 100 m, and its mechanical strength is approximately 10 kpsi or so, one or more orders of magnitude smaller than its theoretical value. These shortcomings are mostly attributable to incomplete preform manufacturing techniques heretofore employed.

Conventionally, two methods, commonly referred to as a build-in casting method, and a rotational casting method have been utilized for the manufacture of preform of this kind, as disclosed in a Publication: JOURNAL OF LIGHTWAVE TECHNOLOGY VOL. LT-2, NO. 5, October 1984, PP 566-586, in the Title "Heavy Metal Fluoride Glasses and Fibers: A Review" by Danh C. Tran, George H. Sigel JR., and Bernard Bendow.

As described in detail below, the conventional manufacturing methods entail the crystallization of glass at the boundary between the core and the cladding, so that the entrapping of water in the preform results, which leads to the fiber loss, raising difficulties in making a large preform rod and in controlling the core-clad diameter, i.e. in making a preform rod for a single mode fiber. Moreover, it is almost impossible, in the prior art, to avoid scratching of the surface of the preform rod which impairs the strength of the fiber which is spun out thereof, and manufacturing steps requiring the use of human hands are involved. Accordingly, the conventional methods are low in yield rate of product and poor in industrial-scale productivity.

SUMMARY OF THE INVENTION

An object of the present invention is to provide a method and an apparatus for manufacturing a preform for the fluoride making of glass fibers which are free from the above-mentioned defects of the prior art. The present invention precludes the possibilities of the crystallization of glass at the boundary between the core and the cladding and of the entrapping of water in the preform which causes fiber loss, and hence the invention permits the production of a large preform rod. Moreover, the present invention ensures highly accurate control of the core-cladding diameter, enabling the fabrication of a preform for single mode fibers. Moreover, glass refining steops for dehydration, the removal of compound ions, the reduction of the absorption loss by transition metals, etc. and preform manufacturing steps are combined into a series of steps, and the entire manufacturing process can be mechanized and automatically controlled; therefore, the yield rate of product is high and the industrial-scale productivity is also excellent.

To attain the above object, according to the present invention, two nozzle-equipped crucibles, are filled with glass for the core and glass for the cladding, respectively, and held concentrically with each other, are disposed in a sealed vessel provided with a fluorine-series gas charge and discharge means, means for heating the nozzle-equipped crucibles, and a vertical moving rod the top end of which is adapted for preventing glass melts from flowing out of the nozzles and for drawing molten glass out of the crucibles. After the sealed vessel is filled with fluorine-series gas, the core glass and the cladding glass are melted by heating at high temperatures within the range over which no marked evaporation of glass components will occur, whereby the fluorine-series gas is allowed to be reacted with oxides, compound ions, etc. contained in the glass so that these impurities are decomposed and removed. Next, the glass melts are cooled down to and held at a temperature at which the glass will not crystallize, thereby raising the valencies of transition metals contained in the glass so as to reduce the absorption loss from the transition metals. After this, the glass melts are further cooled down to a temperature at which the molten glass becomes viscous enough to be drawn out of the crucibles. Thereafter the vertical moving rod, which has been held in contact with the tips of the nozzles to inhibit the passage therethrough of the glass melts from the crucibles, is gradually moved downward to thereby draw the glass out of the nozzles, and the glass thus drawn out is cooled for solidification, thus obtaining a preform for the fluoride glass fiber.

BRIEF DESCRIPTION OF THE DRAWINGS

The present invention will be described in detail below in comparison with prior art with reference to accompanying drawings, in which:

FIGS. 1A to 1D are a series of schematic cross-sectional views explanatory of a conventional build-in casting method for the manufacture of a preform for a fluoride glass fiber;

DETAILED DESCRIPTION

Figure 2A:
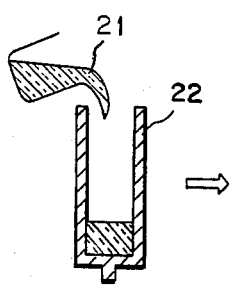
FIGS. 2A to 2D are a series of schematic cross-sectional views explanatory of another conventional rotational casting method.

To make differences between prior art and the present invention clear, examples of prior art will first be described.

PRIOR ART

FIGS. 1A to 1D are explanatory of the build-in casting method. In FIG. 1 reference numeral 21 indicates a cladding glass melt, 22 a metallic mold, 23 a cladding glass tube, and 24 a core glass melt.

With this method, the cladding glass melt 21, melted by heating in a crucible, is poured into the metallic mold 22 which is held at a temperature near the transition point of glass, as shown in FIG. 1A. Next, the metallic mold 22 is turned upside down to pour out therefrom the glass melt 21 before it cools down throughout, as depicted in FIG. 1B, obtaining a cladding glass tube solidified on the inner wall of the metallic mold. Then, as shown in FIG. 1C, the core glass melt 24 is poured into the cladding glass tube 23 and cooled for solidification, thus obtaining a preform rod having a core-cladding structure, as depicted in FIG. 1D.

Figure 2B:
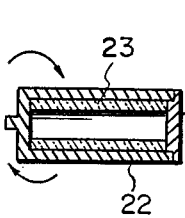
Figure 2C:
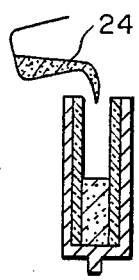
Figure 2D:
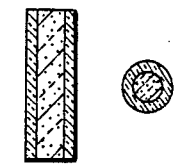

FIGS. 2A to 2D are explanatory of the rotational casting method. In FIGS. 2A to 2D, reference numerals 21 to 24 indicate the parts corresponding to those in FIGS. 1A to 1D, and 25 designates a lid of the mold. With this method, only a required amount of the cladding glass melt 21 is poured into the metallic mold 22 which is retained at the temperature near the transition point of glass, as shown in FIG. 2A. Immediately thereafter the metallic mold 22 is rotated at a high speed with the lid 25 on, as illustrated in FIG. 2B. The cladding glass melt 21 spreads centrifugally over the inner wall of the metallic mold 22 and cools into a solid state while rotating, thus forming the cladding glass tube 23. The thickness of the cladding glass tube 23 is determined by controlling the amount of the cladding glass melt 21 that is poured into the metallic mold. Next, the core glass melt 24 is poured into the cladding glass tube 23, as shown in FIG. 2C, after which it is solidified by cooling, thus obtaining a preform rod which has a core-cladding structure, as depicted in FIG. 2D.

In either case, the transmission loss of the fiber drawn out of the preform rod is larger by two or more units than the theoretical value, the length of the fiber that can be drawn out of the rod is short, say, 100 m or so, and its mechanical strength is also small. One of the causes of such drawbacks resides in low purity of the raw glass material itself, but the manufacturing methods also have many problems left unsolved.

A description will be given first of the reason for the large loss of the fiber. According to either of the prior art manufacturing methods, the glass tube forming the cladding is produced first and then the glass melt for the core is poured into the glass tube. The glass melt must be held at a temperature higher than the melting point of glass, normally in the range of 500° to 600° C. The crystallization temperature of the fluoride glass is lower than its melting point, usually 350° to 400° C. Therefore, upon pouring the core glass melt into the cladding glass tube, the temperature of the inner wall of the latter rises above its crystallization temperature, causing the crystallization of the cladding glass. That is to say, the smoothness at the interface between the core and cladding is disturbed by the precipitation of crystals, which brings about scattering loss. Furthermore, the conventional manufacturing methods involve appreciably complicated work which must be done manually, i.e., by human hands, and control of the working atmosphere for a series of manufacturing steps is, at best, only to flow an inert gas into a globe box. This makes it difficult to completely prevent moisture or water in the atmosphere from getting mixed into the glass; even if the mixing of moisture from the atmosphere is completely prevented, there is no means for removing moisture from the surface of the metallic mold. Moreover, since gases of the halogen series corrode the metallic mold, it is impossible to positively remove the moisture by the use of such active gases. For these reasons, the conventional manufacturing methods cannot completely remove the moisture, which is responsible for absorption loss.

Next, a description will be given of the reason for difficulties in making a large-sized preform for a long fiber through the traditional methods. The preform obtainable in the past is usually about 10 mm in diameter and 100 mm or so in length. In practice, however, since the preform contains bubbles or the like entrapped therein, the actual length of the preform that can be used is even smaller; the length of a fiber which can be drawn out of the preform is in the order of 100 m at most. The primary reason for the difficulty in the manufacture of a largesized preform rod resides in that gas bubbles are entrapped in the core glass melt when the latter is poured into the clad glass tube. That is to say, when the core glass melt 24 is poured into the clad glass tube 23, as shown in FIGS. 1 and 2C, gas will remain as bubbles in the glass because of no escape for the gas in the cladding glass tube. As the cladding glass tube becomes longer and the core diameter becomes smaller, the poured core glass will futher block gas escape, so gas bubbles will be more likely to remain in the preform rod. This is the very reason for which a large preform rod is difficult to produce, and this difficulty will increase with a decrease in the core diameter.

Next, a description will be given of the reason for the small strength of the fiber drawn out of the preform produced by the prior art methods. It is well known that an optical strength of the fiber depends upon the sizes and the number of scratches in the fiber surface; these scratches originate from those already present in the surface of the preform. With the conventional manufacturing methods employing a mold, the surface of the preform inevitably becomes uneven, and hence must be polished in general. The polishing leaves a number of scratches in the surface of the preform, with the result that the strength of the fiber drawn out of such a preform will also diminish naturally.

Next, a description will be made in connection with the reason why the conventional manufacturing methods encounter difficulty in controlling the core-cladding diameter of the preform rod. With such a build-up casting method as depicted in FIGS. 1A to 1D, the cladding glass tube 23 is obtained by pouring the cladding glass melt 21 into the metallic mold held at a temperature near the transition point of glass and pouring out the melt in the middle of the mold before it cools off and solidifies in its entirety. Accordingly, the thickness of the glass tube depends upon the time interval between the pouring of the glass melt into and out of the metallic mold, the temperature of the glass melt when it is poured into the mold, and the temperature at which the mold is held; but it is very difficult to control all the conditions as predetermined. With such a method, difficulties will be encountered in controlling the thickness or the inner diameter of the cladding glass tube and in making a clad glass tube of a small inner diameter for a single mode fiber as well. Because of such insufficient controllability of the inner diameter of the clad glass tube, the corecladding diameter of the preform is also difficult to control.

With the rotational casting method illustrated in FIGS. 2A to 2D, since the thickness of the cladding glass tube can be controlled by only the amount of the glass melt which is poured into the metallic mold, control of the core-cladding diameter is not so difficult as in the case of the buildin casting method. At present, however, the glass melt is poured into the mold manually, so it is appreciably difficult, in practice, to pour the exact quantity of melt into the mold. Furthermore, this method also involves the difficulty in making a cladding glass tube of a small inner diameter but of a large thickness for single mode fibers, for the manufacture of such a cladding glass tube requires highspeed rotation of the mold but the use of such a high-speed rotating device is difficult in practice.

PRESENT INVENTION

Figure 3:
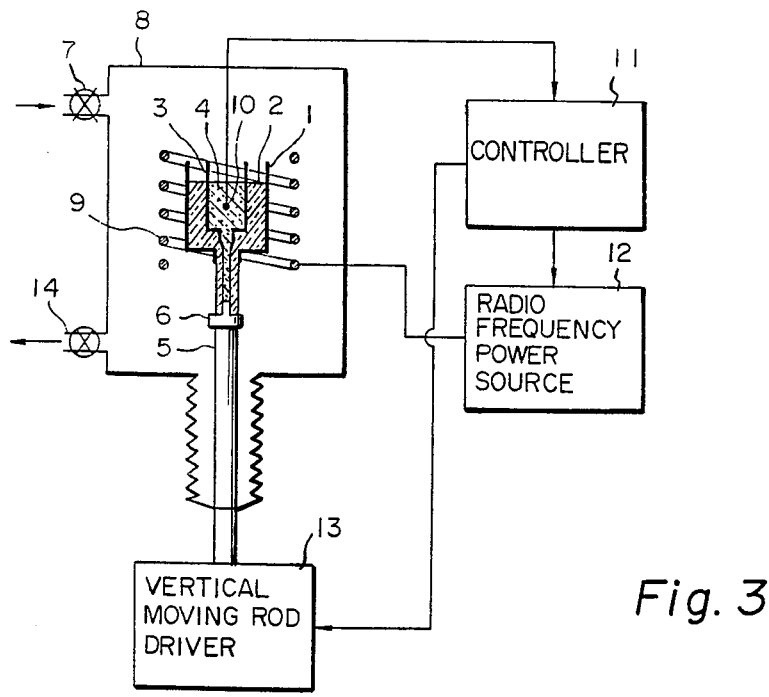
FIG. 3 is a schematic diagram, partly in section, explanatory of the manufacturing method and apparatus of the present invention.

Referring now to FIG. 3, a manufacturing method of the present invention and an apparatus therefor will be described. In FIG. 3, reference numeral 1 indicates an outer crusible equipped with a nozzle, 2 glass for the cladding, 3 an inner crucible equipped with a nozzle, 4 glass for the core, 5 a vertical moving rod, 6 a combination glass melt effusion preventing and glass drawing jig, 7 a gas inlet port, 8 a sealed vessel, 9 a radio-frequency coil, 10 a thermocouple, 11 a control system, 12 a radio-frequency power source, 13 a vertical moving rod driving unit, and a 14 a gas outlet port.

In case of operating the apparatus, the outer crucible 1 is charged with the glass 2 and the inner crucible 3 with the glass 4. The nozzle tips are stopped with the jig 6 for preventing glass melts from running out. Then fluorine-series gas is introduced from the gas inlet port 7 into the sealed vessel 8 to fill it with an atmosphere of the fluorine-series gas, and the crucibles are heated by the radio-frequency coil 9 to melt the glass for a certain period of time. The heating temperature in this case is selected as high as possible but not so high as to cause a marked evaporation of glass components. Next, the welts of the glass 2 and 4 are cooled down to the lowest possible temperature within the range in which no precipitation of the crystal phase from the glass melts will occur, and they are held at that temperature for a predetermined period of time. After this, the glass melts 2 and 4 are cooled down to a temperature at which they become viscous enough to drawn out. Then, the vertical moving rod 5 is moved downward to draw out from the nozzle tips the core glass 2 and the clad glass 4, which are cooled and solidified, thus obtaining a preform for the fluoride glass fiber. The temperature control in this process is carried out by directly detecting the glass temperature with the thermocouple 10 and controlling the output of the radio-frequency power source 12 through the control system 11 accordingly. The control of the glass drawing-out rate is effected by electrically controlling the vertical moving rod driving unit 13 through the control system 11.

The fluorine-series gas filling the sealed vessel 8 is introduced therein for fluorinating $ZrO_2$, $BaO$ and similar oxides contained as impurities in the glass, or removing $OH$, $NH_4$, $NO_3$, $CO_3$, $SO_4$ and like compound ions by decomposition. For instance, $NF_3$ gas is effective for this purpose.

The reason for melting the glass at the highest possible temperature within the range in which no appreciable evaporation of glass components will occur is (1) to completely melt the glass raw material and (2) to accelerate the reaction of the fluorine-series gas with the abovesaid oxides and compound ions contained in the glass raws material. For example, when the $NF_3$ gas is employed, the melting temperature is in the range of 750° to 950° C. and the melting time is an hour or so.

The reason for cooling the glass melts down to the lowest possible temperature within the range in which no crystal phase will precipitate from the glass melts is to raise the valencies of Fe, Cr and like transition metals contained as impurities in the glass, thereby reducing the absorption loss from the transition metals. The transition metal ion which is the most harmful to the fluoride glass fiber, for instance, is an $Fe^{2+}$ ion; but the conversion of the $Fe^{2+}$ ion to an $Fe^{3+}$ ion will decrease the absorption loss sharply. This change is based on a reaction: $FeF_2+F \rightleftharpoons FeF_3$, and the reaction proceeds further to the right-hand side with an increase in the fluorine partial pressure and with a decrease in temperature. Accordingly, the lower the temperature of the glass melt is, the more readily the $Fe^{2+}$ ion changes to the $Fe^{3+}$ ion. For instance, where the glass melts are maintained at 480° to 500° C. for an hour or so in a 10% $NF_3/Ar$ gas atmosphere, $Fe^{2+}$ ions contained in the glass mostly change to $Fe^{3+}$ ions and the absorption loss becomes negligibly small.

Such two-stage temperature control will ensure a marked reduction of the absorption loss from impurities contained in the glass.

Next, the glass melts are cooled as rapidly as possible so as to increase their viscosity sufficient for drawing out. The viscosity of the glass suitable for drawing is usually in the range of $10^4$ to $10^6$ poises, and the glass temperature for such a viscosity is 310° to 350° C. The fluoride glass is primarily liable to crystallize; it has been considered that a high cooling rate above 60° C./min is needed for preventing the crystallization. The build-in casting method and the rotational casting method, described previously, both have been forced to employ a metallic mold for the purpsoe of achieving the above high cooling rate. It has been ascertained, however, that where oxides and compound ions contained in the glass are removed therefrom and the glass melts are cooled in the fluorine-series gas atmosphere, positively free from the possibility of entrapping water into the glass melts, as in the method of the present invention, even a low cooling rate of approximately 10° C./min would not cause the crystallization of the glass so long as it has a composition of relatively high stability. Moreover, it has also been found that this cooling rate could easily be achieved by such an apparatus as shown in FIG. 3. After the viscosity of the glass has reached the value suitable for drawing, the vertical moving rod 5 is caused to move downward, drawing to the glass from the crucibles. Until this operation, the nozzle tips are stopped with the combination glass melt leakage-preventing and glass-drawing jig 6 for preventing the glass melts 2 and 4 from running out.

Figure 4:
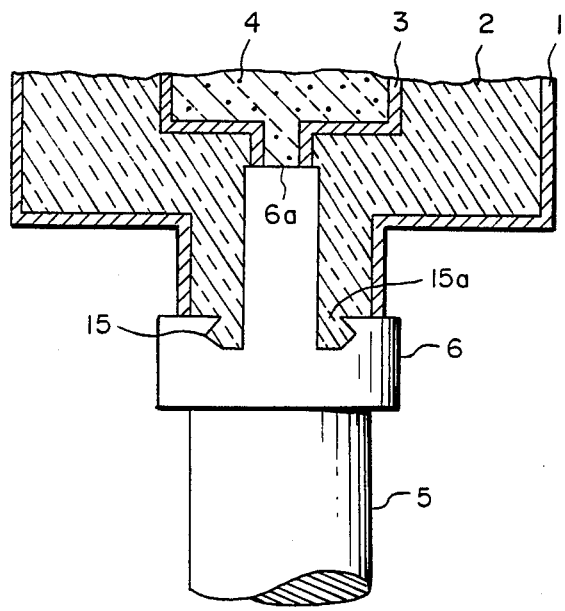
FIG. 4 is a cross-sectional view explanatory of the structure of a jig for preventing glass melts from running out of crucibles and for drawing out glass in the manufacturing method and apparatus of the present invention.

FIG. 4 illustrates an example of the structure of the jig 6 for preventing leakage of glass melts and for drawing out the glass. In FIG. 4, reference numerals 1 to 6 indicate the parts corresponding to those identified by the same reference numerals in FIG. 3. Reference numerals 6a designates a projection for preventing the glass melt 4 from running out, and 15 a stop groove which receives the lower end of the clad glass 2 through a narrow space 15a defined by an inwardly projecting upper edge of the groove. At high temperatures the viscosity of the fluoride glass melt is so small, it is fluid like water, so the melt is likely to flow out even through a slight gap. Nevertheless, in a case where the nozzles and the jig 6 are made of graphite, since the wettability of the glass melt on the graphite is negative, the glass melts can be prevented from leakage simply by holding the jig 6 in contact with the nozzles, as depicted in FIG. 4. Since the glass is caught in the stop groove 15 through the narrow space 15a, the glass 2 and 4 can be drawn out without separating from the jig 6. As the vertical moving rod 5 is caused to move downward, the glass 2 and 4 extrudes by its own weight. Accordingly, a preform rod of a fixed diameter can be obtained by moving the vertical moving rod 5 in accordance with the amount of glass extruded. The amount of glass extruded is in inverse proportion to the viscosity of the glass and the height from the nozzle tip to the glass level. Therefore, the diameter of the preform rod can easily be controlled by controlling the moving speed of the vertical moving rod 5 in response to precalculated temporal variations in the glass level, the viscosity of the glass kept at a fixed value by maintaining the glass temperature unchanged. Furthermore, by changing the ratio between the nozzle diameters of the outer and inner crucibles 1 and 3, the core-clad diameter can be controlled with ease. Hence, a preform rod of a small core diameter for a single mode fiber can easily be produced as well. For the manufacture of a large preform rod, it is necessary only to use larger crucibles for increasing the amount of glass which is drawn out. Moreover, according to the method of the present invention, since the core glass and the cladding glass are always held at the same temperature, there is no possibility of crystallization at the boundray between them. Besides, according to the method of the present invention, the glass is not cooled by the use of metallic mold, but instead it is drawn out of the nozzle tips into the free space, where it is cooled and solidified. On this account, flaws in the surface of the preform rod which impairs the fiber strength are few, so a strong fiber can be obtained. In addition, the method of the present invention basically involves, for the manufacture of the preform two kinds of control, that is, temperature control of the crucibles and control of the moving speed of the vertical moving rod, and does not call for complex work operations which must be done manually; and the two kinds of control can easily be automated.

Accordingly, the method of the present invention is excellent in industrial-scale productivity and in the yield rate of product.

(Example)

A preform was manufactured by the employment of the apparatus shown in FIG. 3, using glass of a composition, $53ZrF_4$-$20BaF_2$-$20NaF$-$4LaF_3$-$3AlF_3$, as the core glass, and glass of a composition, $33ZrF_4$-$20HfF_4$-$17BaF_2$-$23NaF$-$4LaF_3$-$3AlF_3$, as the cladding glass. A dual nozzle-equipped crucible made of graphite was filled with about 250 g of raw glass materials of the above compositions, and the glass was molten at 800° C. for an hour, while at the same time introducing 10% $NF_3$/Ar gas at a flow rate of about 5 l/min. Then, the glass melt was cooled down to 500° C. and held at this temperature for an hour, after which the glass melt was further cooled down to 315° C. at a rate of about 25° C./min and was drawn out of the nozzle. As a result, a step index type preform rod could be produced which was 15 mm in the cladding diameter, 3 mm in the core diameter and 150 mm in length. The preform thus obtained was completely free from gas bubbles and its microscopic examination did not show any precipitation of the crystal phase and any flaws in the rod surface.

As described above, the method and apparatus of the present invention for the manufacture of a preform for a fluoride glass fiber do not involve the crystallization of glass at the boundary between the core and the cladding and the entrapping of water into the preform and have the capability of controlling the core-cladding diameter with high accuracy, thus permitting the fabrication of a preform rod for the single mode fiber and a large preform rod. According to the present invention, flaws in the surface of the preform rod which impair the fiber strength are few, and gas refining steps for dehydration, the removal of compound ions and the reduction of absorption loss from transition metals and preform manufacturing steps are combined into a series of steps, besides the entire manufacturing steps can be mechanized and automated. Therefore, the manufacturing method and apparatus of the prsesent invention are excellent in the yield rate of product and in the industrial-scale productivity.

Accordingly, the present invention ensures the fabrication of a low-loss, long, strong, low-cost fluoride glass optical fiber for use in optical communication and the like.

What we claim:

1. A method of manufacturing a fluoride glass preform for drawing therefrom a fluoride glass optical fiber comprising, containing in a first crucible fluoride glass material for use as cladding on the optical fiber and containing a different fluoride glass material in a second crucible, containing the crucibles in a sealed vessel containing a fluorine-series gas charge as an atmosphere, melting the glass in the crucibles into two glass melts by application of heat simultaneously in a same temperature range over which no marked evaporation of glass components occurs and at which the fluorine-series gas reacts with oxides and compound ions contained in the glass so that impurities are decomposed and removed, cooling the melts to a same temperature and holding it without crystallizing the glass melts effectively raising the balances of transition metals contained in the melts to a level for reducing absorption losses in the optical fiber made therefrom, further cooling the melts to a same temperature, drawing glass from the melts concentrically as a rod having a core of said core glass and a cladding made of said cladding glass about said core, and cooling the rod to solidify it into said preform.

2. A method of manufacturing a fluoride glass preform for drawing therefrom a fluoride glass optical fiber according to claim 1, including controlling the cross section dimension of said rod by controlling a vertical speed of the drawing of the rod from the melts.

3. A method of manufacturing a fluoride glass preform for drawing therefrom a fluoride glass optical fiber according to claim 1, in which said rod is cooled in free space for solidification thereof.

4. A method of manufacturing a fluoride glass preform for drawing therefrom a fluoride glass optical fiber according to claim 1, in which the fluorine-series gas in said sealed vessel is introduced for effecting fluorinating $ZrO_2$, BaO and similar oxides in the melts.

5. A method of manufacturing a fluoride glass preform for drawing therefrom a fluoride glass optical fiber according to claim 1, in which the fluorine-series gas in said sealed vessel is introduced for effecting removal of OH, $NH_4$, $NO_3$, $CO_3$, $SO_4$ and like compound ions by decomposition.

6. A method of manufacturing a fluoride glass preform for drawing therefrom a fluoride glass optical fiber according to claim 1, in which said fluorine-series gas is $NF_3$.

7. A method of manufacturing a fluoride glass preform for drawing therefrom a fluoride glass optical fiber according to claim 6, in which the temperature for melting the glass is in the range 750° to 950° C. and the melting time is approximately an hour.

8. Apparatus for manufacturing a fluoride glass preform for drawing therefrom a fluoride glass optical fiber comprising, two crucibles for containing therein a fluoride glass material for use as cladding on the optical fiber to be drawn and a second crucible for containing a different fluoride glass material for use as a core of the optical to be drawn, a sealed container containing the two crucibles, means for introducing a fluorine-series gas into the sealed vessel for establishing an atmosphere in said sealed vessel, heating means for heating the two crucibles jointly in the sealed vessel at a same temperature rate to a same temperature level to develop two separate glass melts in the crucibles, means for drawing from the melts in the crucibles molten core glass concentrically with molten cladding glass about the core glass as a vertically descending rod defining the preform.

9. Apparatus for manufacturing a fluoride glass preform for drawing therefrom a fluoride glass optical fiber according to claim 8, in which said heating means comprises means for developing a radio frequency internally of the vessel for heating the crucibles simultaneously to said same temperature.

10. Apparatus for manufacturing a fluoride glass preform for drawing therefrom a fluoride glass optical fiber according to claim 9, in which the internal volumes of the crucibles and the internal volume of the sealed vessel have a ratio for making it possible for sufficient fluorine-gas to be available in the atmosphere in the sealed vessel for effecting removal of ions in the melts by decomposition at given temperatures, and in which said heating means effects heating of the melts to said given temperatures.

11. Apparatus for manufacturing a fluoride glass preform for drawing therefrom a fluoride glass optical fiber according to claim 9, including temperature sensing means and control means coactive with the sensing means for first controlling said heating means for effecting in a sequential order melting the glass in each crucible at a same high temperature without marked evaporation of glass components into said atmosphere of a fluorine-series gas and at a temperature effective for the fluorine-series gas and oxides, compound ions and impurities in the glass react with each other to remove the impurities, said control means including means for lowering said temperature and holding a second but lowered temperature of the melts at which there is no crystallization of the glass and effective so that the valencies of Fe, Cr and similar transition metals contained in the glass melts are raised to thereby reduce absorption loss due to the transition metals, said control means including control means for reducing the temperature of the melts for cooling the glass melts down to a temperature at which the glass melts become sufficiently viscous to be drawn out of the crucibles and sealed vessel, means for allowing the viscous glass outwardly of the vessel as said rod.

* * * * *